(12) United States Patent
Ibaraki et al.

(10) Patent No.: US 8,440,016 B2
(45) Date of Patent: May 14, 2013

(54) SULFATE RESISTANT GROUND GRANULATED BLAST FURNACE SLAG, SULFATE RESISTANT CEMENT, AND METHOD OF PRODUCTION OF SAME

(75) Inventors: Tetsuharu Ibaraki, Tokyo (JP); Yukihiko Nagao, Tokyo (JP)

(73) Assignees: Nippon Steel & Sumitomo Metal Corporation, Tokyo (JP); Nippon Steel Esment Kanto Co., Ltd, Chiba (JP)

( * ) Notice: Subject to any disclaimer, the term of this patent is extended or adjusted under 35 U.S.C. 154(b) by 20 days.

(21) Appl. No.: 12/737,892

(22) PCT Filed: Aug. 19, 2009

(86) PCT No.: PCT/JP2009/064810
§ 371 (c)(1),
(2), (4) Date: Apr. 15, 2011

(87) PCT Pub. No.: WO2010/024260
PCT Pub. Date: Mar. 4, 2010

(65) Prior Publication Data
US 2011/0214591 A1    Sep. 8, 2011

(30) Foreign Application Priority Data

Aug. 25, 2008  (JP) ................................. 2008-215865

(51) Int. Cl.
*C04B 11/00*   (2006.01)
(52) U.S. Cl.
USPC ........................... 106/772; 106/776; 106/789
(58) Field of Classification Search .................. 106/789, 106/772, 776
See application file for complete search history.

(56) References Cited

U.S. PATENT DOCUMENTS

| | | | |
|---|---|---|---|
| 2009/0151604 A1 | 6/2009 | Hirao et al. | |
| 2010/0101458 A1 * | 4/2010 | Ibaraki et al. | 106/695 |

FOREIGN PATENT DOCUMENTS

| | | |
|---|---|---|
| JP | 4-238847 | 8/1992 |
| JP | 8-12387 | 1/1996 |
| JP | 8-175855 | 7/1996 |
| JP | 8-268736 | 10/1996 |
| JP | 2001-220197 | 8/2001 |
| JP | 2001-233645 | 8/2001 |
| JP | 2004-059396 | 2/2004 |
| JP | 2004-292307 | 10/2004 |
| JP | 2005-035877 | 2/2005 |
| JP | 2008-179504 | 8/2008 |
| JP | 2008-201656 | 9/2008 |
| WO | WO 2007/046297 | 4/2007 |

OTHER PUBLICATIONS

International Search Report dated Nov. 24, 2009 issued in corresponding PCT Application No. PCT/JP2009/064810.
Third Party submission in the corresponding Japanese application No. 2010-509596 of Nov. 12, 2012 (mailed Dec. 11, 2012).
Y. Arai, Materials Chemistry for Cemet, p. 208-213, Mar. 10, 1984.
Japan Concrete Institute, Point of Concrete Technology '94, p. 5, Sep. 10, 1994.

* cited by examiner

*Primary Examiner* — Paul Marcantoni
(74) *Attorney, Agent, or Firm* — Kenyon & Kenyon LLP

(57) ABSTRACT

A ground granulated blast furnace slag for sulfate resistant cement comprising a mixture of ground granulated blast furnace slag with an alumina content of 12 to 17.5 mass % and high dissolution rate gypsum of 2 to 6 mass % of gypsum converted to mass of $SO_3$.

6 Claims, 1 Drawing Sheet

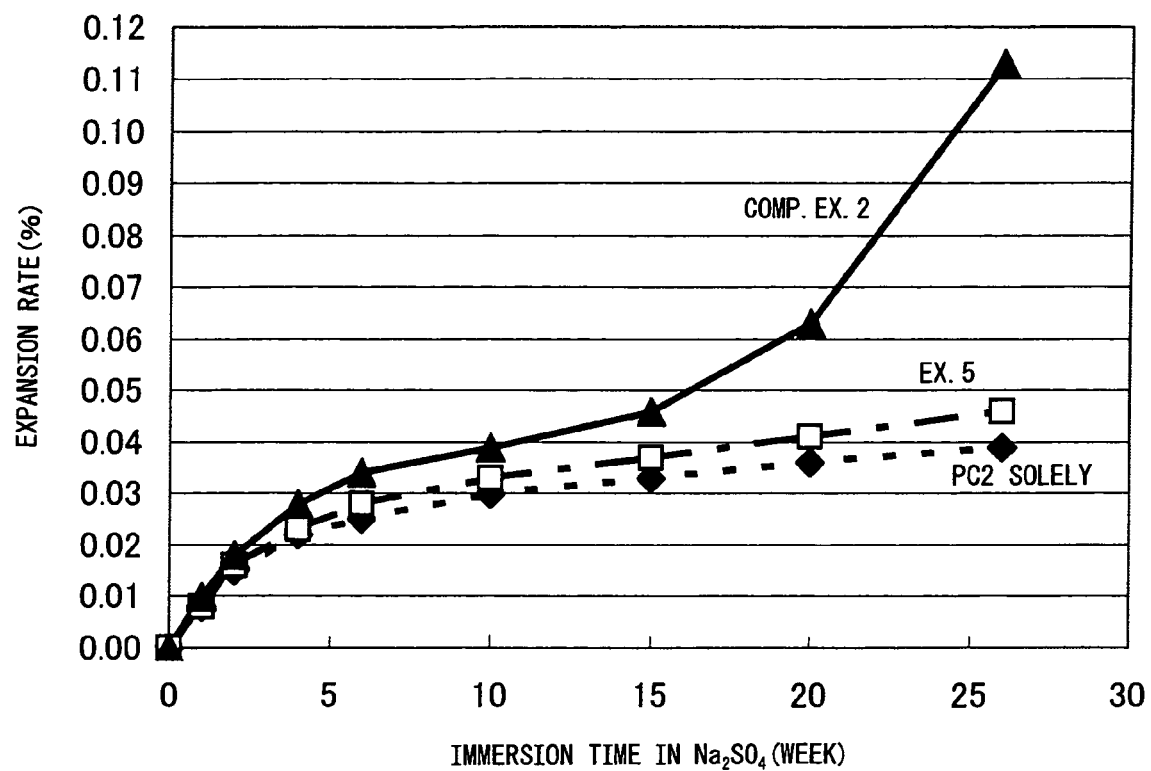

SULFATE RESISTANT GROUND GRANULATED BLAST FURNACE SLAG, SULFATE RESISTANT CEMENT, AND METHOD OF PRODUCTION OF SAME

This application is a national stage application of International Application No. PCT/JP2009/064810, filed 19 Aug. 2009, which claims priority to Japanese Application No. 2008-215865, filed 25 Aug. 2008, which is incorporated by reference in its entirety.

TECHNICAL FIELD

The present invention relates to a sulfate resistant cement which is durable against sulfates and is comprised mainly of a mixture of Portland cement and high alumina ground granulated blast furnace slag and to ground granulated blast furnace slag as a material for the same. The sulfate resistant cement according to the present invention, for example, can be applied to the concrete or mortar of structures installed in soil containing sulfates, the concrete or mortar of structures where invasion of sulfate ions from seawater would be a problem, the concrete or mortar of structures contacting water containing sulfate ions such as water treated at sewage treatment plants, etc.

BACKGROUND ART

Portland cement, blast furnace slag cement, and other cement is broadly used for cement concrete for soil reinforcement, civil engineering structures, buildings, etc. The advantages of cement are that it is easy to make various shapes of structures by pouring into a mold either mortar or fresh concrete obtained by mixing a mixture of cement and an aggregate with water and that it is possible to produce concrete structures with high compressive strength. Further, it is possible to mix limestone or clay, which are available in huge quantities on the earth, with blast furnace slag, fly ash, or other industrial byproducts for use, so there is the advantage of the possibility of supply of large quantities at low cost. Due to these advantages, cement is one of the industrial products used in the greatest amounts.

In cement, blast furnace slag cement is a high vitrification rate granulated blast furnace slag (hereinafter simply referred to as "blast furnace slag") which is finely ground (ground granulated blast furnace slag (GGBFS)) alone or a mixture of ground granulated blast furnace slag with Portland cement etc. Granulated blast furnace slag is a granulated material which contains a large amount of glass produced by water cooling blast furnace slag in a molten state at 1,300 to 1,500° C. Ground granulated blast furnace slag obtained by grinding this blast furnace slag by a grinding mill to a specific surface area of 3,000 (Blaine) or more, in high activity products, 4,000 to $6,000_{Blaine}$, is used as a cement material.

Note that, blast furnace slag is an inorganic substance of mainly ingredients produced as a byproduct when producing pig iron in an ironmaking blast furnace. In general, it contains $SiO_2$ in 30 to 35 mass %, CaO in 40 to 45 mass %, MgO in 2 to 8 mass %, and, further, $Al_2O_3$ in 6 to 18 mass %. Further, as trace ingredients, it contains $TiO_2$, CaS, FeO, etc. If the blast furnace slag has a vitrification rate of 95% or more, it is possible to produce good performance blast furnace slag cement.

If the water is alkaline, the CaO and $Al_2O_3$ contained in the ground granulated blast furnace slag will leach out from the granulated slag into the water causing a hydration reaction and contributing to solidification of the cement structure. However, under conditions where the water is neutral or acidic, the setting reaction of the ground granulated blast furnace slag will be extremely slow, so except for special cases, a mixed cement of Portland cement or another strongly alkaline cement with ground granulated blast furnace slag is used. In general, cement containing ground granulated blast furnace slag up to 30 mass % has substantially an equivalent function to the cement mixed with.

That is, the initial strength and the final strength of the solidified cement produced by this are substantially the same as the cement mixed with. This mixed cement can be used for applications in place of Portland cement in building and civil engineering fields. Further, cement containing ground granulated blast furnace slag in 30 to 70 mass % is slow in initial set of the solidified cement, but is high in final strength, is low in heat generation, and has other features. Due to this, it is used for large structures and civil engineering applications. In this way, it is possible to change the ratio of mixture of the ground granulated blast furnace slag in accordance with the application of the cement. Further, blast furnace slag cement is high in seawater resistance, has the effect of suppressing alkaline aggregate reactions, etc. Therefore, it is strong in durability even under adverse conditions and can be used for concrete for wavebreaker blocks, bridge trestles, etc.

Note that, blast furnace slag includes low alumina grades ($Al_2O_3$ content less than 10 mass %) and high alumina grades ($Al_2O_3$ content 10 mass % or more). High alumina ground granulated blast furnace slag releases many aluminum ions forming hydrates when the concrete solidifies. As a result, the concrete or mortar becomes higher in strength, so it is possible to produce good quality blast furnace slag cement from ground granulated blast furnace slag using high alumina blast furnace slag as a material.

In this way, blast furnace slag cement using high alumina ground granulated blast furnace slag has the feature of a high final strength of the solidified cement. However, in cement mainly comprised of high alumina ground granulated blast furnace slag and Portland cement, in soil containing sulfates, due to the effect of the sulfate ions, sometimes the concrete will expand over a long period of several years after solidification to 10 or so years after it. This is because aluminum ions are eluted from the alumina in the blast furnace slag and, further, calcium ions are eluted from the blast furnace slag and limestone contained in the Portland cement. These react with the sulfate ions to produce sulfates and, finally, form ettringite. This ettringite further reacts with the aluminum ions eluted and forms monosulfates of aluminum and calcium oxides. After the concrete solidifies, if sulfate ions further permeate the concrete, the monosulfates and sulfate ions will react and again form ettringite. At this time, the concrete will expand in volume, so the cement concrete will expand. In the worst case, the concrete will expand and cause the structure to be destroyed. In Japan, areas near volcanoes and some coastal areas have considerable sulfate soil. Further, overseas, dry belts such as the Middle East and the West Coast of North America have much sulfate soil. In these areas, the soil contains residual calcium sulfate, magnesium sulfate, sodium sulfate, etc. These sulfates corrode cement concrete resulting in easy occurrence of the problem of expansion and deterioration of the cement concrete.

To solve the problem of damage to concrete structures due to this sulfate expansion, low calcium aluminate Portland cement highly resistant to sulfate expansion is mixed with blast furnace slag cement for use.

Further, for applications where the effect of the sulfates is particularly large, sometimes the mixing ratio of the high alumina ground granulated blast furnace slag is made 60 mass % or more, preferably 70 mass % or more. That is, the ratio of Portland cement is lowered, the elution of calcium ions from the Portland cement is decreased, and the balance of the aluminum ions and calcium ions changes, so there are not enough calcium ions for formation of ettringite and therefore formation of ettringite is suppressed.

In mixed cement containing mainly high alumina ground granulated blast furnace slag and Portland cement, various measures are being taken to prevent sulfate expansion. For example, with mixed cement comprising low alumina Portland cement in which ground granulated blast furnace slag is mixed to 60 mass % or more, preferably 70 mass % or more, it is possible to suppress concrete expansion in a sulfate environment even more than the case of Portland cement alone, but the initial setting of the concrete was slow. As a result, it was only possible to use this for some civil engineering applications such as dams or embankments where the initial setting is allowed to be slow. Therefore, there was the problem that it was not possible to apply this for the production of concrete panels or tunnel segments or for building foundations.

In PLT 1, as the method for suppressing concrete expansion due to sulfates, sulfate ions for reacting with the aluminum ions initially eluted from the ground granulated blast furnace slag were introduced into the fresh concrete in advance. In this method, by forming the ettringite at an early timing, that is, before the expression of the concrete strength, it was possible to form ettringite after the concrete curing. Specifically, by adding a large amount of gypsum ($CaSO_4$, anhydrous crystals and hydrated crystals in some cases) to blast furnace slag cement, expansion in a sulfate environment was suppressed.

However, in blast furnace slag cement containing ground granulated blast furnace slag to 10 to 60 mass %, even in the case of mixing in Portland cement with the greatest sulfate expansion inhibiting effect, it was necessary to add gypsum to the total cement weight in an amount of 4 mass % or more converted to $SO_3$. However, the sulfate ions which are eluted from gypsum also have the effect of delaying cement setting, so if increasing the amount of addition of gypsum, there was the problem that the initial setting of concrete (within 1 to 3 days) was delayed. As a result, application to uses where fast setting is necessary such as building foundations or concrete panels or tunnel segments was difficult. Further, if adding a large amount of gypsum, there was also the problem of a drop in the final strength. To suppress this effect, it is necessary to make the amount of addition of gypsum 4 mass % or less converted to $SO_3$. That is, in the prior art, there was no method for simultaneously achieving the conditions for the concrete setting speed of mixed cement made of high alumina ground granulated blast furnace slag and Portland cement and solving the problem of sulfate expansion.

PLT 2 and PLT 3 describe, as a method for production of concrete with high durabilities under conditions of a large presence of sulfate ions and further under an acidic environment, adding, in addition to the cement, 100 micron or less size granulated blast furnace slag, granulated steelmaking slag, and vitrification rate 10% or less slag aggregate. However, in this method, due to the formulation of materials at the time of installation of the concrete, the sulfuric acid resistance of the concrete was improved, but the sulfate resistant performance of the cement itself was not improved. Therefore, in this method, use was difficult in locations where only general aggregate can be obtained or for structures where it is necessary to use high strength aggregate.

By using blast furnace slag as a cement material, it is possible to make one of the byproducts produced by ferrous metal production, that is, blast furnace slag, into a high added value industrial material. This enables effective utilization of resources and energy conservation. However, to expand this application, it was necessary to raise the durability of blast furnace slag cement using high alumina ground granulated blast furnace slag in sulfate soil. Therefore, PLT 4 and PLT 5 were proposed for satisfying both this objective and the setting ability of cement.

PLT 4 proposes the addition of ground gypsum powder for the purposes of improving the setting function of blast furnace slag cement and lower the cost of increasing the fineness. Due to this, it was learned that by using gypsum powder with a high specific surface area, it is possible to create blast furnace slag cement having a performance equal to that of conventional blast furnace slag cement even if the ground granulated blast furnace slag is relatively small in specific surface area.

PLT 5 proposes control of the physical properties of a cement material by increasing the fineness of gypsum through the use of ground granules of high alumina blast furnace slag for the purpose of improving the durability in sulfate soil. It is important to increase the supply of sulfate ions at the start of setting, so increasing the fineness of the gypsum increases the dissolution speed and creates an excess supply of sulfate ions to thereby raise the initial settability.

CITATION LIST

Patent Literature
PLT 1: Japanese Patent Publication (A) No. 8-12387
PLT 2: Japanese Patent Publication (A) No. 2005-35877
PLT 3: Japanese Patent Publication (A) No. 2004-59396
PLT 4: Japanese Patent Publication (A) No. 2008-179504
PLT 5: Japanese Patent Publication (A) No. 2008-201656

SUMMARY OF INVENTION

Technical Problem

It was learned that it becomes possible to control the physical properties of cement not only by making the blast furnace slag finer as proposed in PLT 4 or PLT 5, but also by making the gypsum finer and raising the dissolution speed. Further, to obtain this advantageous effect, it is necessary to uniformly mix high-dissolution rate gypsum. However, high-dissolution rate gypsum differs in grain size and specific gravity from Portland cement, so uniform mixing is not easy. In particular, if raising the dissolution speed by using fine gypsum of $8000_{Blaine}$ or more, the bulk specific gravity becomes smaller and uniform mixing with Portland cement becomes even more difficult. That is, to apply blast furnace slag and obtain sulfate resistant cement exhibiting homogeneous initial solidification properties, it is important to uniformly mix the blast furnace slag, Portland cement, and high-dissolution rate gypsum. Resolution of this problem is necessary.

Solution to Problem

The inventors engaged in intensive studies and as a result discovered that ground granulated blast furnace slag and high-dissolution rate gypsum are close in bulk specific gravity and that if mixing these, uniform mixing is possible. Furthermore, they discovered that the blast furnace slag cement which is obtained by mixing this mixture of ground granulated blast furnace slag and high-dissolution rate gypsum with Portland cement is uniformly mixed and thereby completed the present invention. The present invention has as its gist the following.

(1) Ground granulated blast furnace slag for sulfate resistant cement characterized by comprising a mixture of ground granulated blast furnace slag with an alumina content of 12 to 17.5 mass % and high-dissolution rate gypsum of 2 to 6 reduced mass % of $SO_3$ mass.

(2) Ground granulated blast furnace slag for sulfate resistant cement characterized by comprising ground granulated blast furnace slag for sulfate resistant cement as set forth in (1) to which calcium carbonate is further mixed to 1 to 10 mass %.

(3) Ground granulated blast furnace slag for sulfate resistant cement as set forth in (1) or (2) characterized in that said high-dissolution rate gypsum is hemihydrate gypsum, type III anhydrous gypsum, or anhydrous gypsum with a specific surface area of $8000_{Blaine}$ or more.

(4) Sulfate resistant cement characterized by comprising a mixture of ground granulated blast furnace slag for sulfate resistant cement as set forth in any of said (1), (2), or (3) and Portland cement containing gypsum in 1.5 to 4 reduced mass % of $SO_3$.

(5) Sulfate resistant cement as set forth in (4) characterized in that said Portland cement has a calcium aluminate content of not more than 5 mass % and in that a total of two times the mass of the calcium aluminate and the mass of calcium aluminate ferrite is a content of not more than 20 mass % of said Portland cement.

(6) A method of production of sulfate resistant cement characterized by mixing ground granulated blast furnace slag for sulfate resistant cement as set forth in any of said (1), (2), or (3) and Portland cement containing gypsum in 1.5 to 4 reduced mass % of $SO_3$.

ADVANTAGEOUS EFFECTS OF INVENTION

In concrete structures using the ground granulated blast furnace slag and the sulfate resistant cement of the present invention, it is possible to prevent abnormal expansion even under conditions of contact with soil with residual sulfates or with water containing sulfate ions. If applying the sulfate resistant cement according to the present invention, as main examples of concrete structures in which the effect of suppression of expansion can be achieved, use is possible for the concrete for building foundations, road structures, bridge foundations, tunnel segments, the surfaces of river and coastal embankments, concrete building foundation piles, mortar or concrete for solidification for preventing falling rocks in tunnels or at slanted surfaces, etc. In this way, the sulfate resistant cement of the present invention can be applied to concrete structures in contact with sulfate-containing soil, which is broadly found throughout the world, or water containing sulfate ions.

BRIEF DESCRIPTION OF DRAWINGS

FIG. 1 is a view showing the relationship between the immersion time of sulfate resistant cement in sodium sulfate and the expansion rate in examples of the present invention.

DESCRIPTION OF EMBODIMENTS

The high alumina granulated blast furnace slag used in the sulfate resistant cement of the present invention is comprised of limestone (CaO) in 38 to 45 mass %, silica ($SiO_2$) in 30 to 35 mass %, and alumina ($Al_2O_3$) in 12 to 17.5 mass %.

Further, it includes magnesia (MgO) in 3 to 8 mass % and small amounts of $TiO_2$, FeO, CaS, and other inorganic substances. This blast furnace slag, in a molten state at 1,300 to 1,500° C., is charged into water to obtain granulated slag with a vitrification rate of 95% or more (granulated blast furnace slag). Ground blast furnace slag is a granular substance with an average grain size of 0.5 to 3 mm or so. The higher the granulated blast furnace slag in vitrification rate, the higher the reactivity as cement, so the material of the sulfate resistant cement of the present invention more effectively has a vitrification rate of 95% or more, preferably 98% or more.

The ground granulated blast furnace slag which is used for the present invention should have an alumina content of 12 to 17.5 mass %. With ground granulated blast furnace slag with an alumina content of less than 12 mass %, the ground granulated blast furnace slag itself loses sulfate expandability. Further, with ground granulated blast furnace slag with an alumina content of over 17.5 mass %, the blast furnace slag becomes too high in alumina. With gypsum alone, sulfate expansion can no longer be sufficiently suppressed. With a mixed product of ground granulated blast furnace slag of this range of alumina content with Portland cement, the sulfate ions in the water react with the aluminum ions and calcium ions which were eluted at the start of setting and form ettringite in the concrete. After that, aluminum ions are further eluted and the ettringite becomes monosulfates of aluminum and calcium salts (monosulfates). Over a long period of time after solidification, the sulfate ions react with these monosulfates whereby ettringite is again formed. At this time, hydrate expansion occurs and the solidified cement expands. As a result, the problem of sulfate expansion of the concrete or mortar occurs. On the other hand, this composition of ground granulated blast furnace slag contributes to the hydration solidification reaction of alumina and has the advantages of high strength of the concrete and mortar, so if possible to solve the problems of sulfate expansion, the result would become a superior cement material. Therefore, the ground granulated blast furnace slag covered by the present invention is made one of an alumina content of 12 to 17.5 mass %.

This granulated blast furnace slag is ground by a grinding mill to obtain ground granulated blast furnace slag. The grinding mill may be of any type but a vertical mill comprised of a rotary table and a plurality of rollers or a ball mill, rod mill, vibrating mill, etc. may be used for the grinding process. This ground granulated blast furnace slag preferably has a specific surface area of $3500_{Blaine}$. If the specific surface area is smaller than $3500_{Blaine}$, the ground granulated blast furnace slag falls in reactivity and the concrete strength becomes lower. Further, on the other hand, if the ground granulated blast furnace slag is too high in specific surface area, at the start of setting, the amount of elution of aluminum ions becomes too great and the production of monosulfates from the ettringite after concrete solidification becomes greater. Therefore, preferably the specific surface area is made $6000_{Blaine}$ or less. Note that, the "specific surface area" described in the present Description is the area which is measured by the method of running air through a powder in a column, measuring the air flow rate and pressure difference, and finding the specific surface area from these, that is, the so-called "Blaine method".

The crystal composition of Portland cement is comprised of dicalcium silicate ($2CaO.SiO_2$ (C2S)) in 10 to 40 mass %, tricalcium silicate ($3CaO.SiO_2$ (C3S)) in 40 to 70 mass %, tricalcium aluminate ($3CaO.Al_2O_3$ (C3A)) in 11 mass % or less, and calcium aluminoferrite ($4CaO.Al_2O_3.Fe_2O_3$ (C4AF)) in 6 to 18 mass %. Further, as trace ingredients, manganese oxide, phosphorus oxide, etc. are included. If seeking a high sulfate resistance, it is possible to use the sulfate resistant durability of the Portland cement itself. In this case, the contents of the alumina-containing minerals of tricalcium aluminate and calcium aluminoferrite may be low. For example, it is possible to use a cement with a tricalcium aluminate (C3A) content of 8 mass % or less and a total of C3A and tricalcium silicate (C3S) of 58 mass % or less (ASTM Type II). Further, if seeking a further higher sulfate resistance, the Portland sulfate resistant durability of the cement may be made further higher. For this reason, for example, as the Portland cement, it is possible to use one with a tricalcium aluminate (C3A) content of 5 mass % or less and a total of double the mass of the tricalcium aluminate (C3A) and the mass of the calcium aluminoferrite (C4AF) of 20 mass % or less (ASTM Type V). The Blaine values of these types of Portland cement are 3200 to $4000_{Blaine}$.

The ratio of mixture of the ground granulated blast furnace slag in the final mixed cement should be 10 to 60 mass %. The reason for defining the ratio of the ground granulated blast furnace slag as 10 mass % or more is that if less than 10 mass %, the sulfate resistance of the mixed cement becomes substantially equal to that of the Portland cement which is mixed in and there is no need to use the technique of the present invention. Further, if the ratio of the ground granulated blast furnace slag is over 60 mass %, the lime ingredient becomes insufficient after setting and the sulfate resistance of the mixed cement ends up becoming equal to that of the Portland cement which was mixed in.

In the present invention, at the very early stage when the cement hydrate is formed, the aluminum ions and sulfate ions are made to react to form more initial ettringite and thereby suppress the formation of ettringite after concrete solidification. For this reason, it is important that the dissolution speed of the gypsum be high. For this reason, the mixing ratio of the gypsum which is mixed in is made 2 to 4 mass % with respect to the mixed cement. Of this gypsum, 0.6 to 4 mass % with respect to the mixed cement should be made high-dissolution rate gypsum. The "high-dissolution rate gypsum" is hemihydrate gypsum, type III anhydrous gypsum, or anhydrous gypsum with a specific surface area of $8000_{Blaine}$ or more.

Hemihydrate gypsum is expressed by the molecular formula $CaSO_4 \cdot 1/2H_2O$ and is comprised calcium sulfate partially hydrated. There are two types of crystal forms: α and β. In the present invention, either is acceptable. Hemihydrate gypsum absorbs water at ordinary temperature and easily changes to dihydrate gypsum. It has the properties of easy dissolution in water etc., but is difficult to store, so has not been used much as gypsum for cement. In the present invention, use is made of the property of extremely fast dissolution in water with a pH of 10 or more. Hemihydrate gypsum has the property of 0.43 g dissolving in 100 g of 50° C. water. This amount of dissolution is about two times that of dihydrate gypsum or anhydrous gypsum (type II). Further, the dissolution speed is also fast. The grain size is not particularly an issue, but should be 3000 to $6000_{Blaine}$.

"Type III anhydrous gypsum" is anhydrous gypsum which is formed at 110 to 220° C. Type III anhydrous gypsum includes two types of crystal forms, that is, α and β. In the present invention, either is acceptable. Type III anhydrous gypsum, like hemihydrate gypsum, has a high hydrating property and is fast in dissolution speed, but is difficult to handle. The grain size is not particularly an issue, but, like with hemihydrate gypsum, should be 3000 to $6000_{Blaine}$.

The generally available anhydrous gypsum is the type I and type II. Gypsum ground to 3000 to $6000_{Blaine}$ is usually used for cement. In the present invention, to raise the dissolution speed, ground anhydrous gypsum with a further larger specific surface area is used. To raise the dissolution speed over the usual anhydrous gypsum, $700_{Blaine}$ or more becomes necessary, but to obtain a remarkable effect in the present invention, the anhydrous gypsum should be made one with a specific surface area of at least $8000_{Blaine}$, preferably $10,000_{Blaine}$ or more. However, the smaller the grain size, the more difficult the granulation, so industrially the size may be made up to $23,000_{Blaine}$. Further, the anhydrous gypsum may be crystals of either the type I or type II, but the easy-to-dissolve type II anhydrous gypsum is better.

When producing the sulfate resistant cement according to the present invention, uniformly mixing the Portland cement with the ground granulated blast furnace slag and gypsum, in particular high-dissolution rate gypsum, is important in obtaining homogeneous properties of the obtained mixed cement. As explained above, in the past, the practice had been to simultaneously mix these materials or to add and mix the gypsum later to a mixture of ground granulated blast furnace slag and Portland cement. However, with this method, it was not easy to uniformly mix the ground gypsum, in particular high-dissolution rate gypsum, and the properties of the obtained concrete varied.

A part of the mixed cement with a low ratio of high-dissolution rate gypsum will deteriorate in sulfate resistance, so it is necessary to ensure uniform mixing to achieve the object of the present invention. High-dissolution rate gypsum differs in grain size and specific gravity from Portland cement. With $8000_{Blaine}$ or more ground gypsum, the grain size is fine and as a result the bulk specific gravity is small. In some cases it is 1 g/cm³ or less. Mixture with Portland cement with a bulk specific gravity of about 1.3 or more was difficult.

Therefore, high-dissolution rate gypsum or other such ground gypsum and ground granulated blast furnace slag are premixed to produce sulfate resistant ground granulated blast furnace slag. Further, by mixing the sulfate resistant ground granulated blast furnace slag into the generally available Portland cement, it is possible to uniformly mix these materials and obtain mixed cement without variation in properties (sulfate resistant cement). According to this method, the industrially demanded uniformity is maintained even with the difficult to mix $8000_{Blaine}$ or more ground gypsum.

Portland cement containing the usual generally available gypsum contains 1.5 to 4 mass % of gypsum converted to $SO_3$. Ground granulated blast furnace slag comprised of ground granulated blast furnace slag with an alumina content of 12 to 17.5 mass % into which high-dissolution rate gypsum is mixed to 2 to 6 reduced mass % of mass of $SO_3$ is mixed into usual Portland cement. At this time, if the mixing ratio of the high-dissolution rate gypsum is less than 2 reduced mass % of mass of $SO_3$, even with high-dissolution rate gypsum, it will not be possible to secure enough sulfate ions to neutralize the aluminum ions which are eluted from the ground granulated blast furnace slag and therefore the effects of the present invention will not be able to be exhibited. If increasing the mixing ratio of the high-dissolution rate gypsum, the sulfate resistance will improve, but if exceeding 6 reduced mass % of mass of $SO_3$, with the ground granulated blast furnace slag covered by the present invention, the aluminum ions can be substantially completely neutralized. For this reason, even if adding more high-dissolution rate gypsum, there is no economic meaning. Further, a detrimental effect on the final strength etc. of the concrete is also feared.

According to this method, what is specially produced is just ground granulated blast furnace slag having sulfate resistance. There is also the advantage of ease of the production process and storage in inventory. There are similar advantages by mixing the later explained 1 to 10 mass % of calcium carbonate powder into this ground granulated blast furnace slag. That is, in the same way as with high-dissolution rate gypsum, if premixing ground granulated blast furnace slag or high-dissolution rate gypsum and calcium carbonate, mixed cement (sulfate resistant cement) which is uniformly mixed is obtained.

If producing concrete by cement containing high-dissolution rate gypsum, since the speed of dissolution of sulfate ions is extremely high, it is possible to change the aluminum ions eluted from the surface of the tricalcium aluminate in the cement or the ground granulated blast furnace slag or cement to ettringite in a short period of time. As a result, at the start of setting, excess aluminum ions are eliminated and the amount of production of ettringite after concrete solidification can be decreased. As a result, it is possible to improve the sulfate resistance of the concrete produced from mixed concrete more than with other types of gypsum.

The ground granulated blast furnace slag in which the high-dissolution rate gypsum is mixed and the Portland cement should be mixed so that the rate of addition of gypsum in the mixed cement becomes 2 to 4% converted to mass of $SO_3$. If less than 4 mass % addition converted to mass of $SO_3$, no excessive mortar setting is seen within 6 hours and the normal effect of prevention of setting of fresh concrete could be obtained. Further, after 28 days, a sufficient mortar compressive strength of about 50N/mm$^2$ was obtained. Both results were substantially equivalent to general mortar or Portland cement. However, with addition of 5 to 6 mass % of gypsum converted to $SO_3$, no drop in fluidity of the fresh concrete could be observed, but the reaction between the cement and gypsum became excessive. The solidification became delayed and there was a problem of a drop in concrete strength 1 to 3 days after installation compared with general products. Therefore, with just increasing the rate of addition of gypsum, it was not possible to achieve both sulfate resistance and concrete strength. From this, it was confirmed that this means did not enable a fundamental solution to the problem. On the other hand, with a rate of addition of gypsum of not more than 2 reduced mass % of $SO_3$, a sufficient effect of suppression of sulfate expansion cannot be obtained. Therefore, gypsum was added in 2 to 4 reduced mass % of $SO_3$. However, the entire amount of gypsum does not have to be high-dissolution rate gypsum. The lowest extent of high-dissolution rate gypsum is, with respect to the mass of mixed cement, 0.6 mass % or more converted to $SO_3$.

It is also possible to add calcium carbonate powder to the above explained mixed cement. Calcium carbonate powder is generally produced by crushing limestone. The reason for adding calcium carbonate powder is as follows: The amount of release of calcium ions from ground granulated blast furnace slag is smaller than from Portland cement. Therefore, in a mixed cement of Portland cement and ground granulated blast furnace slag, there are insufficient calcium ions compared with the eluted aluminum ions. To compensate for this, calcium carbonate powder is added. The amount which is added has to be at least 1 mass % with respect to the ground granulated blast furnace slag. However, if adding over 10 mass % to the mixed cement, the strength of the concrete made by this cement falls.

Note that, as the calcium carbonate powder, it is economical to use limestone which has been crushed to about 2500 to 6000$_{Blaine}$.

The mixed cement of the present invention may have silica fume, power station fly ash, steel furnace dust, and other cement alternatives contributing to concrete strength mixed in with it. However, in a cement in which these are mixed, there are the problems of a slower solidification reaction of the concrete structures and a drop in the final strength etc., so the mixed ratio of these substances to a mixed cement is preferably no more than 25 mass %.

EXAMPLES

Two types of ground granulated blast furnace slag, two types of Portland cement, and four types of gypsum were used to produce mixed cements which were then tested for concrete strength and sulfate expansion. For the gypsum, high-dissolution rate gypsum was used. Hemihydrate gypsum and two types of ground anhydrous gypsum were added. Further, test specimens containing calcium carbonate powder were also tested.

Table 1 to Table 3 show the chemical ingredients and physical properties of the materials used in the invention examples. For the ground granulated blast furnace slag, ones of alumina of 13.4% and 14.5% were used, while for the Portland cement, cement of a medium degree of sulfate resistance containing C3A to 6.5% and cement of a high sulfate resistance containing C3A to 4.6% were used. For the gypsum, hemihydrate gypsum and 8600$_{Blaine}$ and 17000$_{Blaine}$ anhydrous gypsum were used. Further, for the calcium carbonate powder, one obtained by grinding limestone of calcium carbonate 94% down to 4100$_{Blaine}$ was used.

TABLE 1

Ground granulated blast furnace slag

| | Chemical ingredients (mass %) | | | | | Specific surface area cm$^2$/g |
|---|---|---|---|---|---|---|
| | Al$_2$O$_3$ | CaO | MgO | SiO$_2$ | Basicity B | |
| GGBFS1 | 13.4 | 42.6 | 4.8 | 34.9 | 1.74 | 4150 |
| GGBFS2 | 14.5 | 41.8 | 5.1 | 34.3 | 1.79 | 4800 |

TABLE 2

Portland Cement

| | Crystal system (mass %) | | | | Specific surface area cm$^2$/g |
|---|---|---|---|---|---|
| | C2S | C3S | C3A | C4AF | |
| PC1 | 19 | 55 | 6 | 9 | 3480 |
| PC2 | 38 | 43 | 4 | 9 | 3410 |

TABLE 3

Gypsum

| | | Mass % | cm$^2$/g |
|---|---|---|---|
| Gypsum 1 | Hemihydrate | 91.2 | 5200 |
| Gypsum 2 | Anhydrous | 94.8 | 8400 |
| Gypsum 3 | Anhydrous | 94.8 | 17000 |
| Gypsum 4 | Anhydrous | 94.8 | 4800 |

These materials were mixed to produce mixed cements which were then tested for concrete strength and tested for sulfate expansion. The sulfate expansion test was based on the measurement method of the ASTM. The expansion rate after 26 weeks in a 4% sodium sulfate aqueous solution was measured. The formulations of the materials (indicated by mass % with respect to mixed cement as a whole) and the test results are shown in Table 4. Note that the concrete strength was shown by a relative value indexed to the strength of Portland cement alone as "1".

Examples 1 to 8 and Comparative Examples 1 and 2 mixed ground granulated blast furnace slag and gypsum, while Examples 3 to 6 premixed calcium carbonate powder, then mixed in Portland cement to produce mixed cements for evaluation. Comparative Examples 3 and 4, as in the past, mixed all materials simultaneously to produce mixed cements for evaluation.

TABLE 4

Test Results

| | Material | | | | | | Test results | | |
|---|---|---|---|---|---|---|---|---|---|
| | Portland cement | Ground granulated blast furnace slag | | Gypsum (SO$_3$ conversion) | | Calcium carbonate powder | Sulfate 26-week expansion | Concrete 7-day reinforcement | Concrete 28 days |
| Cement alone | PC1 96% | | | Gypsum 4 | 2.2% | | 0.071% | 1 | 1 |
| Ex. 1 | PC1 | 75% GGBFS1 | 21% | Gypsum 1 | 2.6% | | 0.085% | 0.91 | 1.04 |
| Ex. 2 | PC1 | 64% GGBFS1 | 30% | Gypsum 2 | 3.5% | | 0.068% | 0.87 | 1.03 |
| Ex. 3 | PC1 | 62% GGBFS1 | 29% | Gypsum 2 | 3.5% | 4.0% | 0.048% | 0.89 | 1.06 |
| Ex. 4 | PC1 | 50% GGBFS2 | 45% | Gypsum 3 | 2.2% | 1.8% | 0.046% | 0.78 | 1.08 |
| Comp. Ex. 1 | PC1 | 75% GGBFS1 | 21% | Gypsum 4 | 2.3% | | 0.175% | 0.91 | 1.01 |
| Comp. Ex. 3 | PC1 | 64% GGBFS1 | 30% | Gypsum 2 | 3.5% | | 0.070% | 0.9 | 1.02 |
| Cement alone | PC2 96% | | | Gypsum 4 | 2.5% | | 0.039% | 1 | 1 |
| Ex. 5 | PC2 | 72% GGBFS1 | 20% | Gypsum 1 | 3.1% | 1.5% | 0.046% | 0.93 | 1.03 |
| Ex. 6 | PC2 | 72% GGBFS2 | 20% | Gypsum 1 / Gypsum 2 | 1.8% / 1.8% | | 0.043% | 0.94 | 1.05 |
| Ex. 7 | PC2 | 67% GGBFS2 | 24% | Gypsum 3 / Gypsum 4 | 0.9% / 2.5% | 1.9% | 0.046% | 0.89 | 1.05 |
| Ex. 8 | PC2 | 51% GGBFS2 | 44% | Gypsum 3 / Gypsum 4 | 1.8% / 1.8% | | 0.037% | 0.79 | 1.09 |
| Comp. Ex. 2 | PC2 | 72% GGBFS1 | 20% | Gypsum 4 | 3.0% | | 0.113% | 0.89 | 1.03 |
| Comp. Ex. 4 | PC2 | 72% GGBFS1 | 20% | Gypsum 1 | 3.1% | | 0.050% | 0.92 | 1.05 |

PC1 is a medium degree sulfate resistant Portland cement. In a 26 week immersion test of it alone, the expansion rate was 0.071%. This satisfies the standard of Type II cement of the ASTM (0.1% or less). As opposed to this, in the mixed cement of the conventional method of Comparative Example 1, the expansion rate was 0.175%. On the other hand, in Examples 1 to 4 using PC1 to work the present invention, in each case the expansion rate was not more than 0.1%. In Examples 3 and 4 to which calcium carbonate powder was added, the expansion rates were particularly low.

PC2 is a high sulfate resistant Portland cement. In a 26 week immersion test of it alone, the expansion rate was 0.039%. This satisfies the standard of Type V cement of the ASTM (0.05% or less). As opposed to this, in the mixed cement of the conventional method of Comparative Example 2, the expansion rate was 0.113%. On the other hand, in Examples 5 to 7 using PC2 to work the present invention, in each case the expansion rate was not more than 0.05%. Note that, in Examples 7 and 8, gypsum 3 is a mixture with ground granulated blast furnace slag, while gypsum 4 is a mixture with Portland cement. Further, the calcium carbonates of Examples 5 and 7 are included in ground granulated blast furnace slag. As reference, the trends in expansion of PC2 alone and Example 5 and Comparative Example 2 in a sulfuric acid aqueous solution are shown in FIG. 1.

Further, in Comparative Examples 3 and 4, the sulfate resistance and the 28 day strength were both better than with Comparative Examples 1 and 2 or Portland cement alone, but if compared with the invention examples, it was learned that their performances were somewhat inferior. This is believed due to the difference in homogeneity.

Industrial Applicability

According to the present invention, sulfate resistant cement using ground granulated blast furnace slag has now become able to be produced with a good uniformity of the material characteristics. This broadens the applicability of concrete structures in the extensive acid sulfate soil in the world and, further, enables the use of the steelmaking byproduct of blast furnace slag and therefore, through the use of superior resource saving and energy saving materials, provides a globally friendly high quality concrete. We are confident that it will broadly contribute to the development of industry.

The invention claimed is:

1. A ground granulated blast furnace slag for sulfate resistant cement comprising a mixture of ground granulated blast furnace slag with an alumina content of 12 to 17.5 mass % and high-dissolution rate gypsum of 2 to 6 mass % of gypsum converted to mass of $SO_3$.

2. The ground granulated blast furnace slag for sulfate resistant cement comprising ground granulated blast furnace slag for sulfate resistant cement as set forth in claim 1 to which calcium carbonate is further mixed to 1 to 10 mass %.

3. The ground granulated blast furnace slag for sulfate resistant cement as set forth in claim 1 wherein the high-dissolution rate gypsum is hemihydrate gypsum, type III anhydrous gypsum, or anhydrous gypsum with a specific surface area of 8000 cm$^2$/g or more in terms of Blaine value.

4. A sulfate resistant cement comprising a mixture of ground granulated blast furnace slag for sulfate resistant cement as set forth in claim 1 and Portland cement containing 1.5 to 4 mass % of gypsum converted to mass of $SO_3$.

5. A sulfate resistant cement as set forth in claim 4 wherein the Portland cement has a calcium aluminate content of not more than 5 mass % and in that a total of two times the mass of the calcium aluminate and the mass of calcium aluminate ferrite is a content of not more than 20 mass % of the Portland cement.

6. A method of production of sulfate resistant cement comprising mixing ground granulated blast furnace slag for sulfate resistant cement as set forth in claim 1 and Portland cement containing 1.5 to 4 mass % of gypsum converted to mass of $SO_3$.

* * * * *

UNITED STATES PATENT AND TRADEMARK OFFICE
CERTIFICATE OF CORRECTION

PATENT NO. : 8,440,016 B2
APPLICATION NO. : 12/737892
DATED : May 14, 2013
INVENTOR(S) : Ibaraki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 160 days.

Signed and Sealed this
Eighth Day of September, 2015

Michelle K. Lee
*Director of the United States Patent and Trademark Office*